(12) United States Patent
Osaka

(10) Patent No.: US 9,213,507 B2
(45) Date of Patent: Dec. 15, 2015

(54) APPARATUS, CONTROL METHOD, AND STORAGE MEDIUM

(75) Inventor: Hitoshi Osaka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 349 days.

(21) Appl. No.: 12/730,592

(22) Filed: Mar. 24, 2010

(65) Prior Publication Data

US 2010/0251103 A1  Sep. 30, 2010

(30) Foreign Application Priority Data

Mar. 26, 2009  (JP) .................................. 2009-076773

(51) Int. Cl.
*G06F 3/00* (2006.01)
*G06F 3/12* (2006.01)

(52) U.S. Cl.
CPC ............ *G06F 3/1244* (2013.01); *G06F 3/1208* (2013.01); *G06F 3/1243* (2013.01)

(58) Field of Classification Search
CPC ..... G06F 17/212; G06F 17/25; G06F 17/217; G06F 17/211; G06F 17/30905
USPC ......... 715/234, 243, 244, 245, 246, 247, 251, 715/252, 254, 255
See application file for complete search history.

(56) References Cited

U.S. PATENT DOCUMENTS

| 2006/0282768 A1* | 12/2006 | Mielke et al. ................. 715/517 |
| 2007/0146833 A1* | 6/2007 | Satomi et al. ................. 358/537 |
| 2007/0201053 A1* | 8/2007 | Sellers et al. ................. 358/1.2 |
| 2008/0215967 A1* | 9/2008 | Abrams et al. ................ 715/255 |
| 2009/0031401 A1* | 1/2009 | Cudich et al. .................... 726/4 |

FOREIGN PATENT DOCUMENTS

| CN | 101324833 A | 12/2008 | |
| JP | 05-266013 A | 10/1993 | |
| JP | 2004-214991 A | 7/2004 | |
| JP | 2005-149218 A | 6/2005 | |
| WO | WO 2008/110980 | * 9/2008 | ............. G06F 3/048 |

* cited by examiner

*Primary Examiner* — Kyle Stork
(74) *Attorney, Agent, or Firm* — Canon USA, Inc. IP Division

(57) ABSTRACT

An apparatus includes a selection unit configured to select a target page from a plurality of pages having an object, a detection unit configured to detect a page having an object which fits in a margin area in which an object is not arranged in the selected target page from among pages following the target page, and a display unit configured to display the selected target page and the detected page.

12 Claims, 18 Drawing Sheets

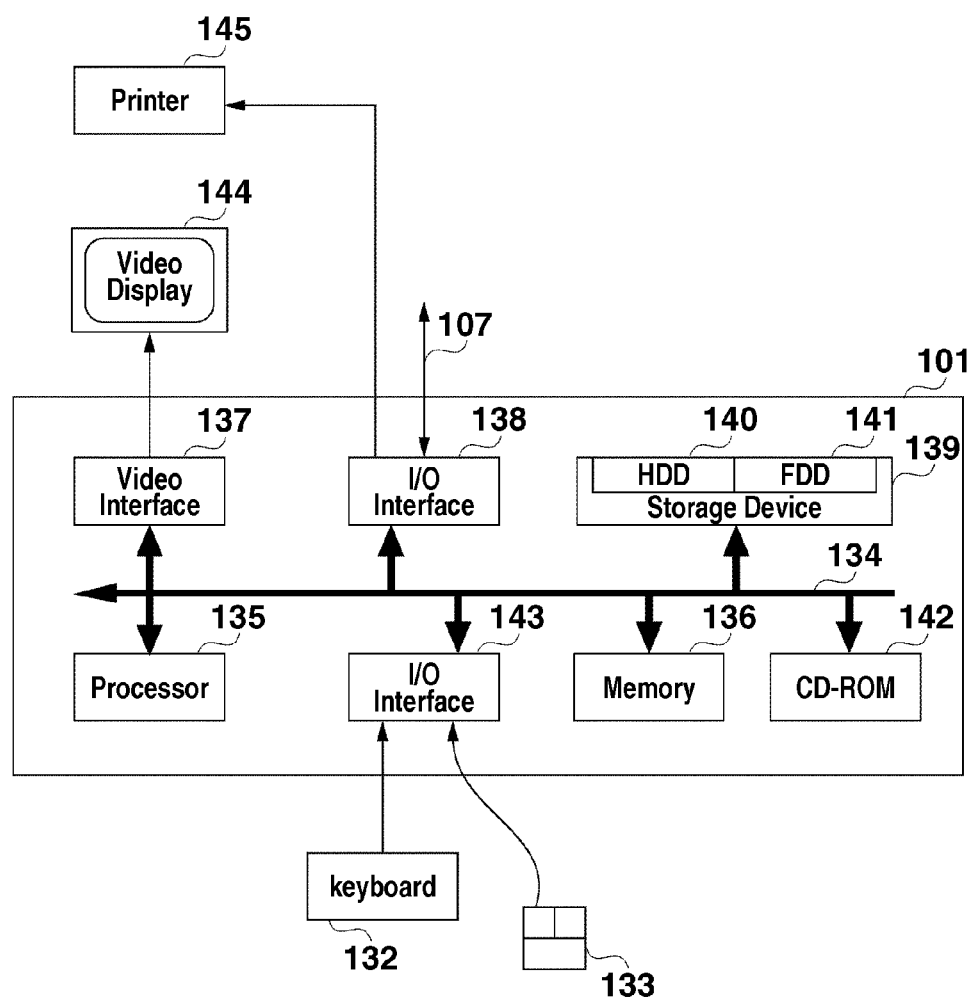

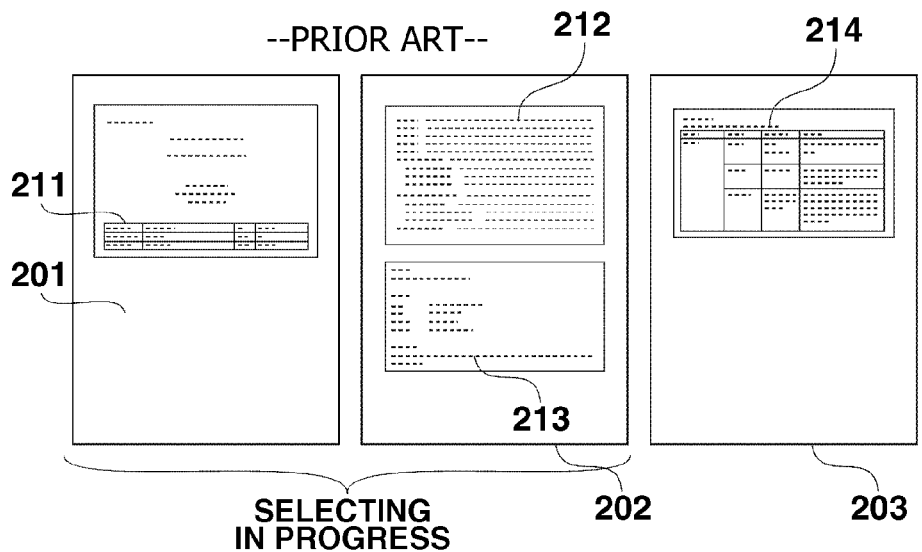
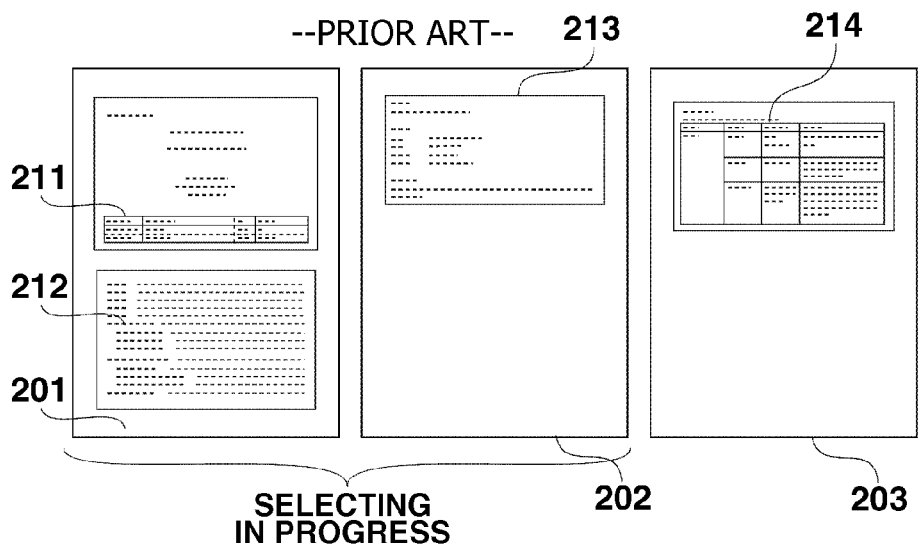

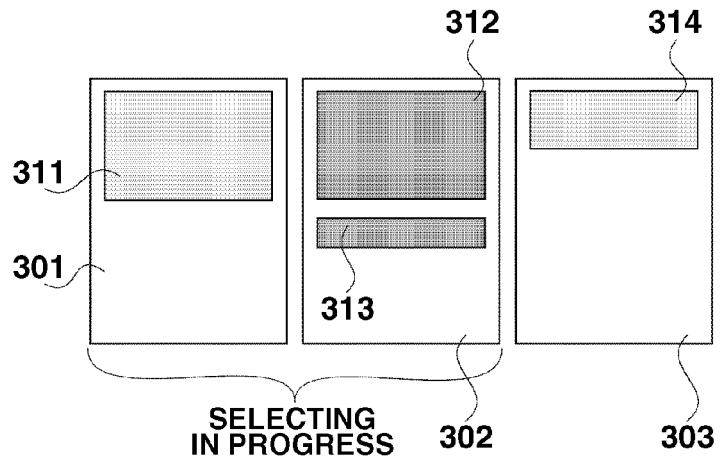
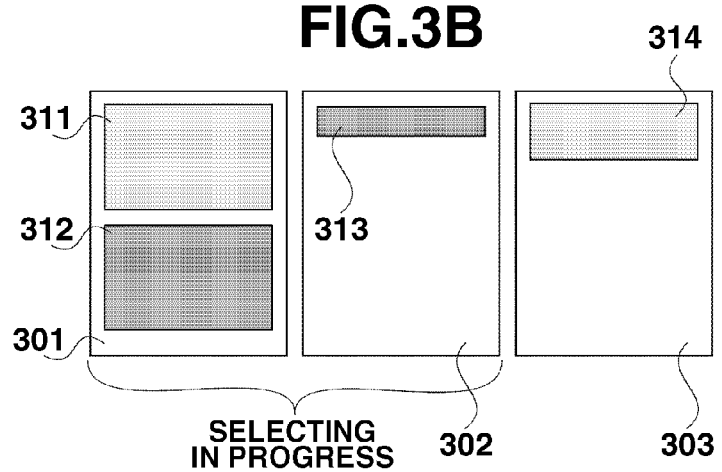
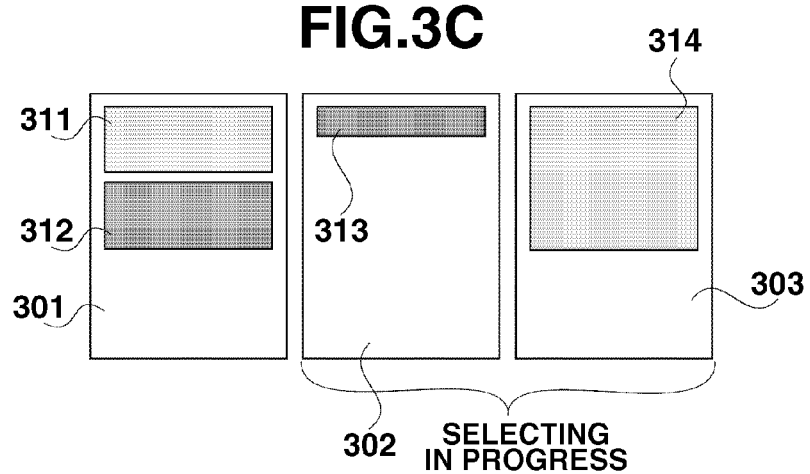

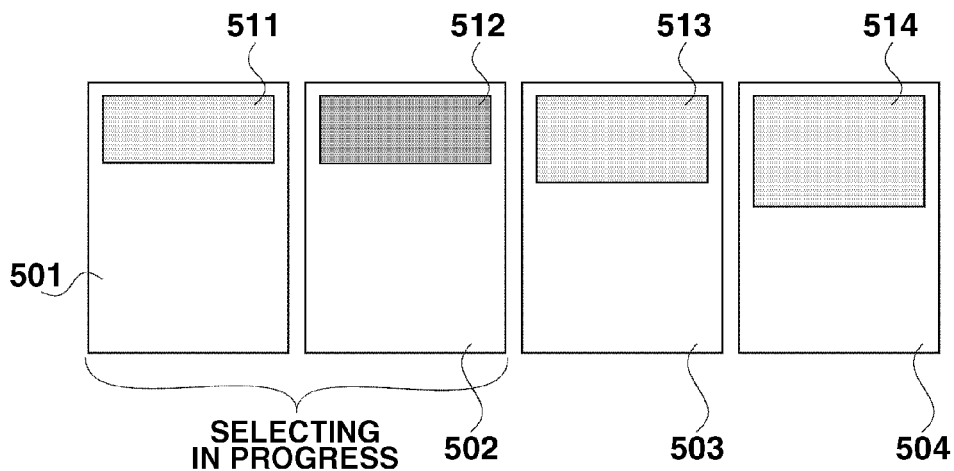
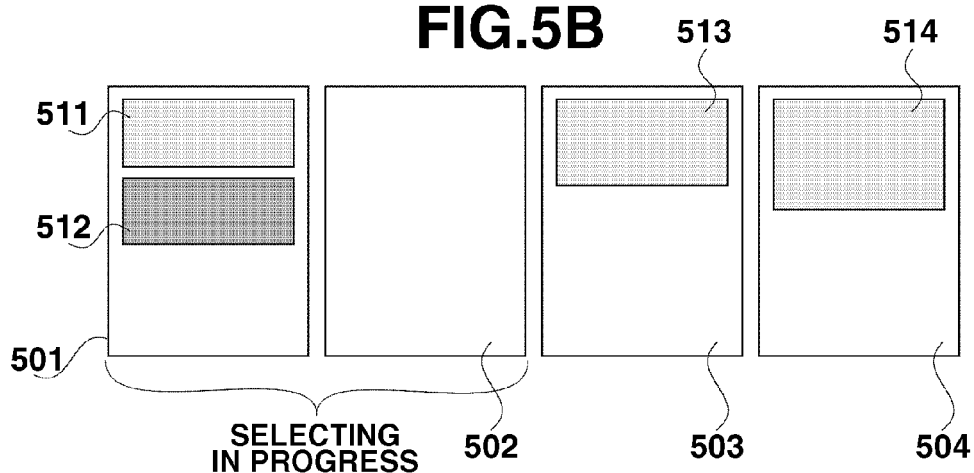
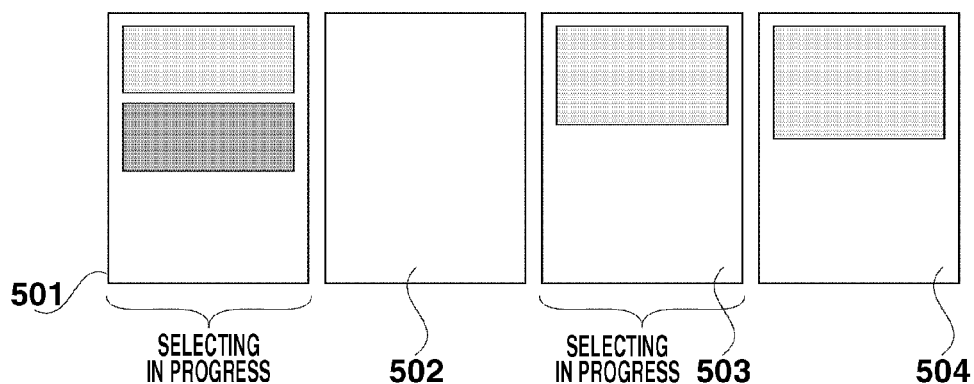

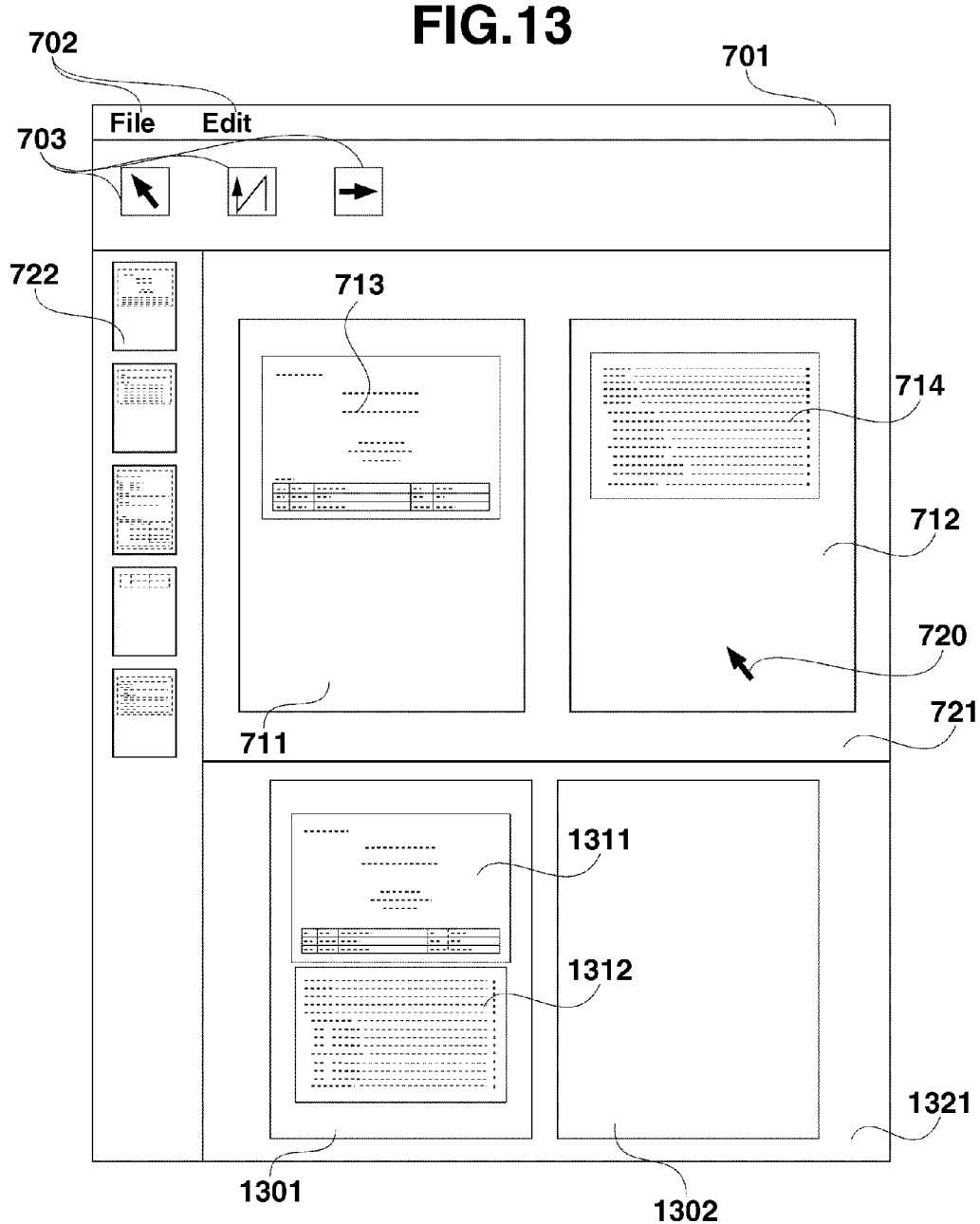

APPARATUS, CONTROL METHOD, AND STORAGE MEDIUM

BACKGROUND OF THE INVENTION

1. Field of the Invention

The present invention relates to an information processing apparatus, a control method, and a storage medium.

2. Description of the Related Art

The present invention relates to a page layout technology for arranging a rendering object, such as a graphic, an image, a character string and the like, on a page.

As an example of conventional page layout technology, Japanese Patent Application Laid-Open No. 2005-149218 discusses a technology for saving paper by arranging print data of a last page on the previous page.

In the present application, the term "page" refers to a limited area such as that of an A4 sheet of paper, and is the area in which an object is arranged. Further, the term "object" refers to a display element, such as a graphic, a character string, an image or a combination thereof, on a page which a user handles by operating software.

If a plurality of pages is a change target like above, the user determines whether to change the layout of a page while observing the plurality of pages which will serve as targets.

Thus, by executing layout processing while confirming the page, the user can avoid undesirable layout changes.

For example, an example will now be considered in which, in a two page display, the layout of those two pages is changed.

This example will be described with reference to FIGS. 2A and 2B. In FIG. 2A, a page 201 and a page 202 are set as layout change targets (indicated by the letters "selecting in progress"; hereinafter the same). An object 211 is arranged in the page 201, and an object 212 is arranged in the page 202. If the object 212 in the page 202 is moved to the page 201, the objects 211 and 212 are arranged in the page 201. Consequently, an arrangement position in the page 202 of an object 213 changes so as to fill a margin area produced by the movement of the object 212. However, since there is no margin area in the page 201 in which the object 213 can be arranged, the object 213 is not moved to the page 201. In this example, it is determined that the object 213 is not moved to the page 201 because there is no margin area in page 201 in which the object 213 can be arranged. However, movement can also be determined to be impossible if the margin amount in the page is less than a predetermined threshold (e.g., height sum of 50 mm).

The size of the margin area can be calculated as illustrated in FIGS. 14A and 14B, for example. For a page 1401 like that illustrated in FIG. 14A, the margin area is the shaded locations 1411 to 1418. More specifically, the area(s) horizontally across the page in which an object is not present is the margin area. Thus, the size of the margin area in the page is determined by determining the sum of the heights of these margin areas. The height of each area can be determined based on coordinate positions in the page.

In FIG. 2B, which is obtained by layout change processing, additional objects cannot be arranged in the page 201. Therefore, the user has to newly select two pages as the next layout change targets.

Depending on the result of layout change, the combination of target pages to be selected next is not limited to the latter page of the pages being selected (page 202 in FIGS. 2A and 2B) and the next page (page 203 in FIGS. 2A and 2B) as illustrated in FIGS. 2A and 2B.

If the layout change processing is executed on FIG. 5A for example, FIG. 5B is obtained. Since there is a margin area in page 501, page 501 can become a layout change target. However, since there are no objects whose layout is to be changed in page 502, page 502 does not become a layout change target.

Therefore, as illustrated in FIG. 5C, the user selects pages 501 and 503 as new layout change target pages. Therefore, the combination of the target pages which is to be selected next is not limited to the latter page of the pages being selected and the next page as illustrated in FIGS. 2A and 2B.

Thus, the user has to determine the arrangement state of the objects in the pages and constantly determine which pages can be combined for layout change. Further, after these determinations, the user has to select the pages to be a target by using software, which can lead to an increased operational burden.

SUMMARY OF THE INVENTION

According to an aspect of the present invention, an apparatus includes a selection unit configured to select a target page from a plurality of pages having an object, a detection unit configured to detect a page having an object which fits in a margin area in which an object is not arranged in the selected target page, from among pages following the target page, and a display unit configured to display the selected target page and the detected page detected.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 illustrates a printing system according to the present invention.

FIGS. 2A and 2B illustrate an example of layout change according to the present system.

FIGS. 3A, 3B, and 3C illustrate an example of layout change and subsequent page selection change.

FIGS. 5A, 5B, and 5C illustrate an example of layout change and subsequent page selection change.

FIG. 13 illustrates another example of a user interface.

DESCRIPTION OF THE EMBODIMENTS

Figure 4A:
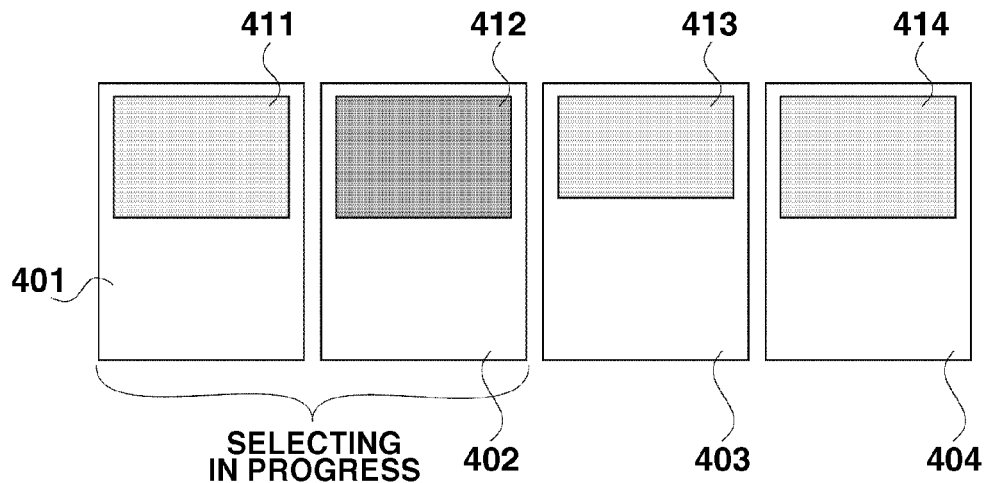
FIGS. 4A, 4B, and 4C illustrate an example of layout change and subsequent page selection change.

Various exemplary embodiments, features, and aspects of the invention will be described in detail below with reference to the drawings.

A first exemplary embodiment will now be described using the drawings.

FIG. 1 illustrates a computer system as an information processing apparatus for executing layout change.

An information processing apparatus (hereinafter referred to as "computer") 101 includes an input device such as a keyboard 132 and mouse 133 or other such pointing devices. The computer 101 is connected to a display device and optionally to an output apparatus which includes a local printer 145. An input/output interface 138 can connect the computer 101 to other apparatuses via a network 107. Typical examples of the network 107 include a local area network (LAN) and a wide area network (WAN).

The computer 101 includes at least one processor unit (CPU) 135, and a memory unit 136 configured from a random access memory (RAM) or a read-only memory (ROM) made from a semiconductor, for example. Further, the computer 101 includes the input/output (I/O) interface 138 which includes a video interface, and an I/O interface 143 for the keyboard 132 and the mouse 133.

A storage device 139 typically includes a hard disk drive 140 and a Floppy® disk drive 141. A compact disc ROM (CD-ROM) is provided as a non-volatile data source.

The software for realizing the sequences illustrated in the flowcharts according to the present invention can be stored in a computer-readable medium. The software is loaded from the computer-readable medium, and executed by the CPU 135. The layout of an electronic document can be changed by using such software.

Unless noted otherwise, the present invention can obviously be applied in a system configured from a single device or in a system configured from a plurality of devices, as long as the functions of the present invention can be executed. Alternatively, the software to be executed may be a printer driver included in the system of a computer, or included in an operating system running on a printing apparatus such as a printer. Further, the present invention can also be similarly applied in a system in which processing is performed via a network connection such as an LAN or a WAN.

Figure 7:
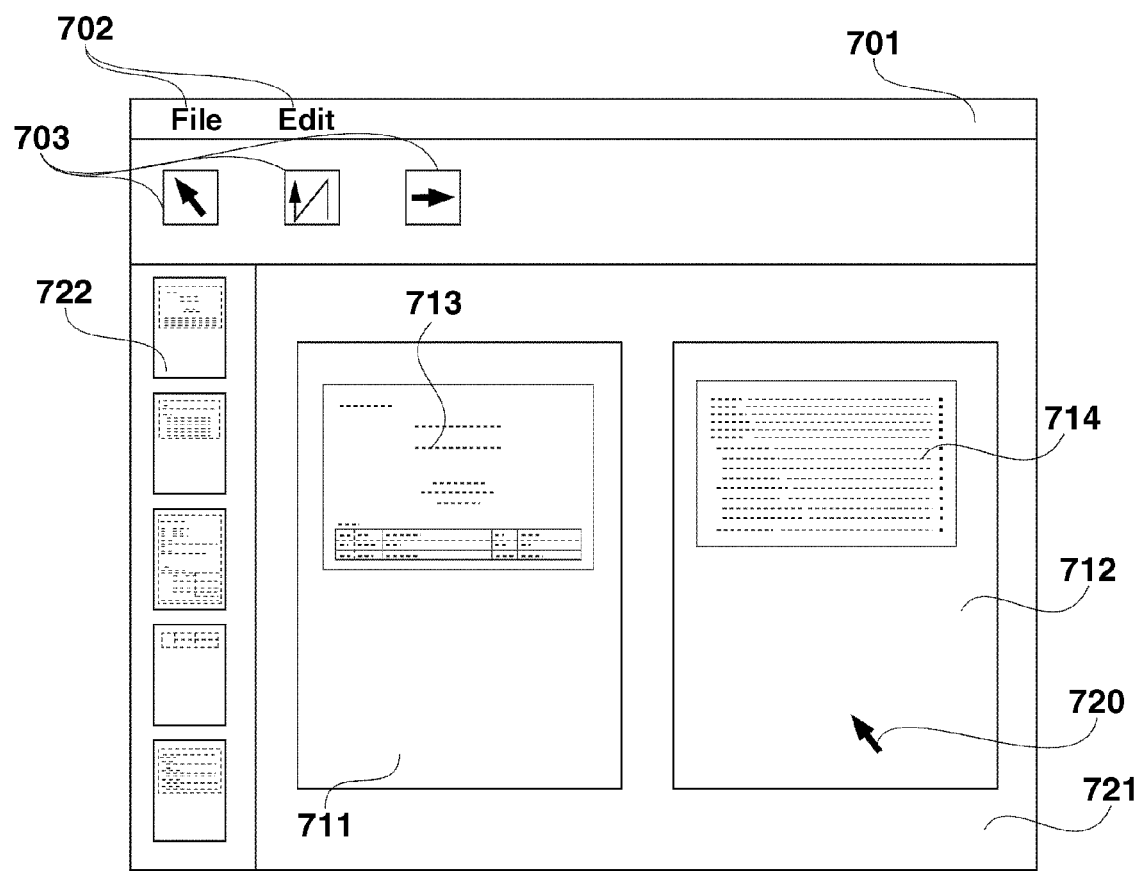
FIG. 7 illustrates a user interface.

FIG. 7 illustrates an example of a software user interface for performing layout change according to the present exemplary embodiment. A window 701 has a menu bar 702, a tool bar 703, and a work area 721 in which work can be performed based on the position and operation of a mouse 720.

Further, in a thumbnail area 722, a pair of pages to serve as layout change targets is selected based on the images in the pages which are displayed in a reduced size, using a mouse cursor 720 operated with the mouse 133.

In the thumbnail area 722, the pages included in the document are displayed in order from the top. The two pages (pages 711 and 712) which are selected as the layout change targets are displayed in a work area 721. The page 711 includes an object 713 and the page 712 includes an object 714.

In the present exemplary embodiment, a control unit sequentially changes the layout of consecutive pages in the document. The idea is to reduce the number of pages in the document by changing the overall layout of a typical document which has continuous content between pages.

Therefore, in the present exemplary embodiment, although consecutive pages are selected, in actual practice the page pair may be freely selected using the mouse cursor 720 based on the contents of the thumbnail area 722.

Layout change can be executed by the user executing a "layout change" command from the menu bar 702 or the toolbar 703. Further, following the currently displayed two pages, a separate two page pair whose layout can be changed is displayed in the work area 721 by similarly executing a "display next layout change targets" command.

Figure 8A:
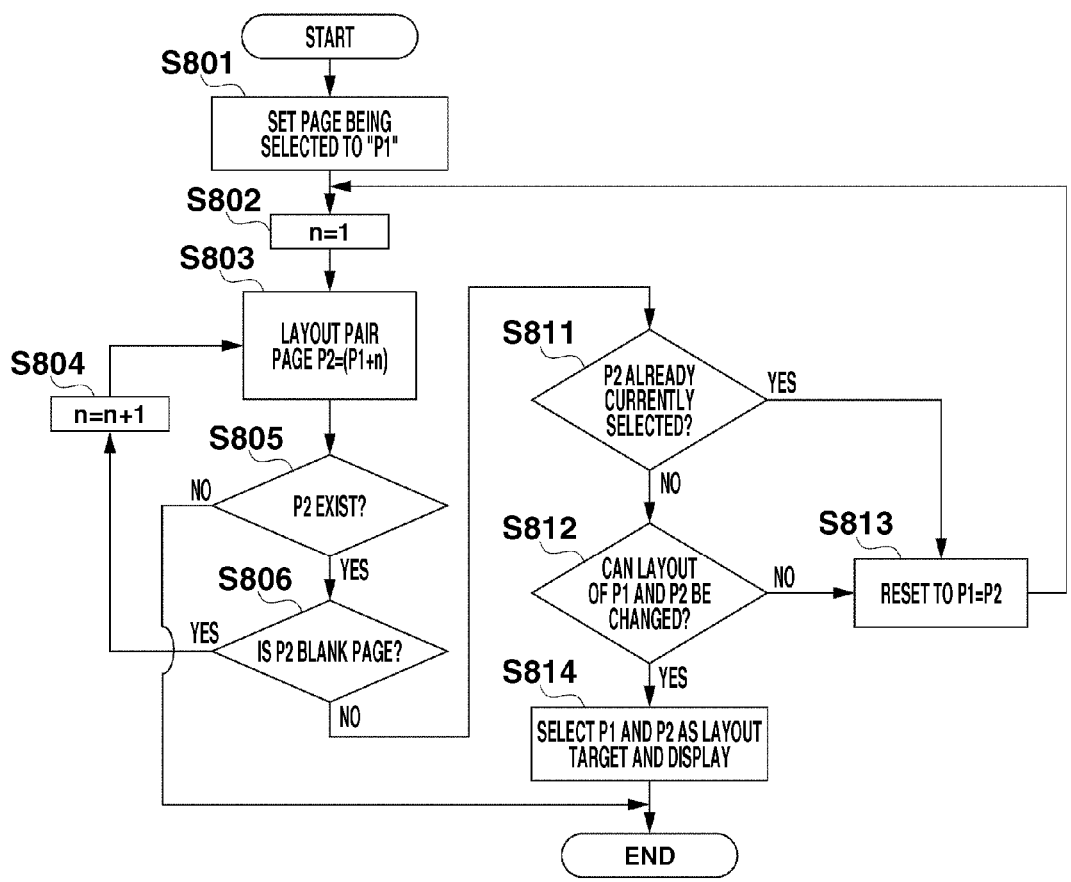
FIGS. 8A and 8B are flowcharts illustrating a first exemplary embodiment.
Figure 8B:
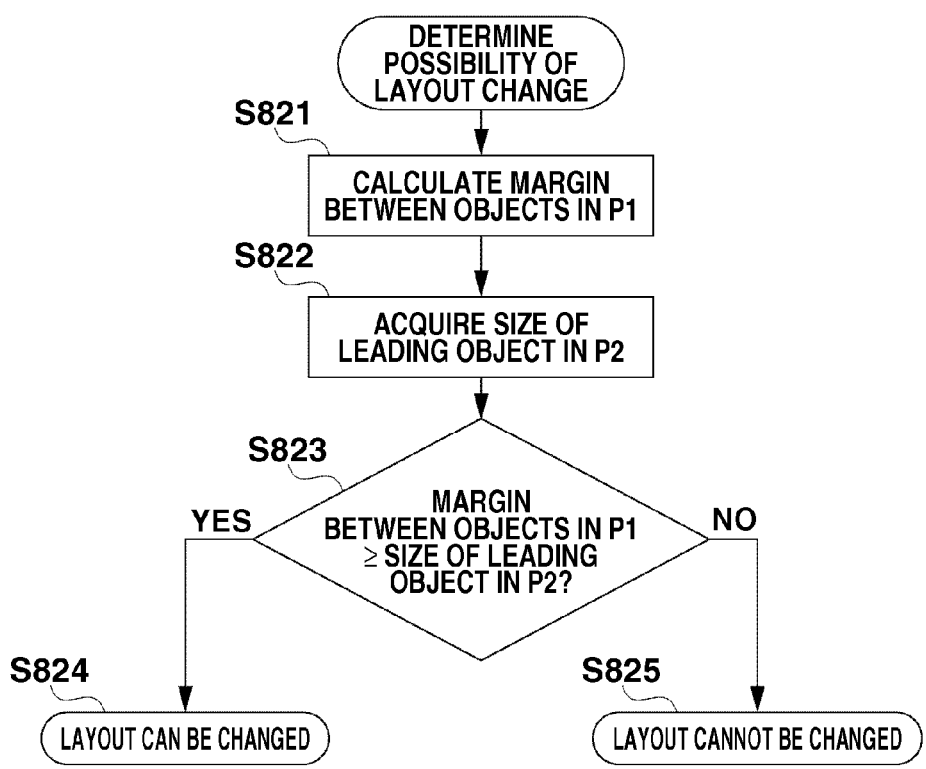

FIGS. 8A and 8B are flowcharts according to the present exemplary embodiment. These flowcharts illustrate the processing performed by the control unit when executing the "display next layout change targets" command.

In the present application, the control unit is configured from the CPU 135, a memory 136, a ROM 142, a HDD 140 and the like. The sequence illustrated in the flowcharts is realized by the CPU reading and executing a related program from the memory.

When the control unit receives the "display next layout change targets" command from the user, the processing proceeds to step S801. In step S801, the currently indicated page in the document is set to "P1" as a target page. In the example of a user interface of FIG. 7, this means the page located on the left side of the work area (in FIG. 7, page 711). Based on the processing of steps S802 and thereafter, a page to serve as a layout target page is detected from the pages following the target page.

Next, in step S802, the control unit sets a loop variable n to 1. Then, in step S803, the control unit sets P2 as a candidate for the page to serve as a layout change pair with the page P1. P2 is the page having a page number obtained by adding n to the document page number of P1. In step S805, the control unit determines whether this page P2 is a page number which exists in the document. If it is determined in step S805 that P2 does not exist (NO in step S805), the processing finishes. If it is determined in step S805 that P2 does exist (YES in step S805), the processing proceeds to step S806.

In step S806, the control unit determines whether an object whose layout should be changed exists in the page P2. If it is determined in step S806 that such an object does not exist (that the page is a blank page) (NO in step S806), the processing proceeds to step S804. In step S804, n is increased by 1. If it is determined in step S806 that such an object does exist (YES in step S806), the processing proceeds to step S811. In step S811, it is determined whether P2 is already selected as a layout change pair. More specifically, the control unit executes the determination processing of step S811 by acquiring the page number of the pages being displayed for selection, from the user interface of FIG. 7, and compares the acquired page numbers with P2.

If it is determined in step S811 that P2 is already selected (YES in step S811), the processing proceeds to step S813. In step S813, the control unit sets P2 as the new P1, and the processing returns to step S802. If it is determined in step S811 that P2 is not already selected (NO in step S811), the processing proceeds to step S812.

Based on the determination of step S811, when repeatedly executing the "display next layout change targets" command, movement to the next layout change target can be easily performed by skipping layout change execution.

In step S812, the control unit determines whether the pages P1 and P2 are a combination of pages whose layout can be changed. This determination method will be described using FIG. 8B.

If it is determined in step S812 that the pages P1 and P2 are pages whose layout can be changed (YES in step S812), the processing proceeds to step S814. In step S814, the pages P1 and P2 are selected as the layout change targets, and displayed in the work area 721. If it is determined in step S812 that the pages P1 and P2 are not a pair whose layout can be changed (NO in step S812), the control unit proceeds to step S813.

Next, a flowchart describing step S812 of FIG. 8A in more detail will be described using FIG. 8B.

Figure 14A:
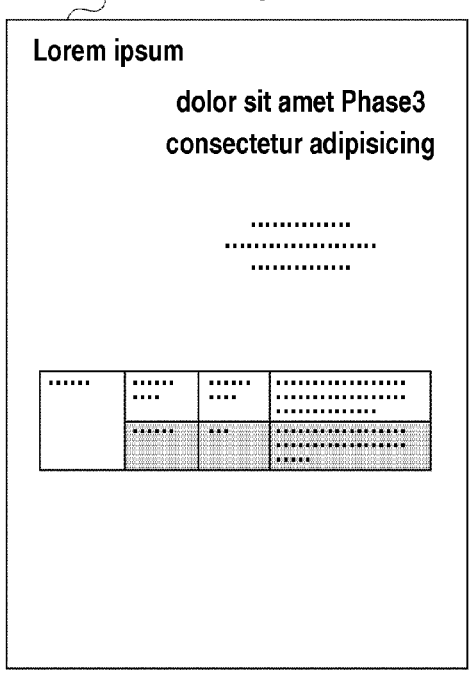
FIGS. 14A and 14B illustrate an example of a method for calculating a margin area.
Figure 14B:
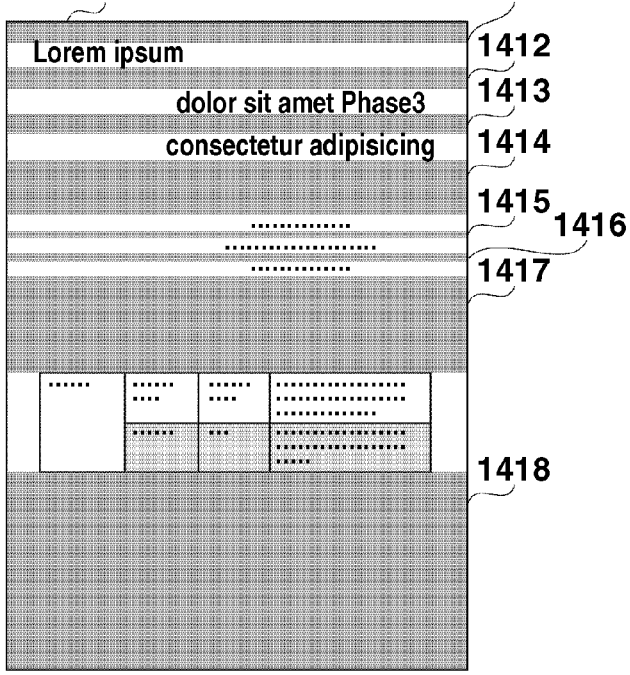

In step S821, the control unit calculates the size of the margin area in which objects do not exist within page P1. The method for calculating the size of the margin area uses a method described in FIGS. 14A and 14B.

In step S822, the control unit acquires the size of an object with the highest coordinate in the page P2. More specifically, if the top left in the page P2 is the origin, the control unit specifies the object whose Y coordinate value is closest to zero as the object with the highest coordinate in the page P2. The size of the object is then calculated using the coordinate values of that specified object.

In step S823, the control unit compares the size of the margin area of P1 calculated in step S821 with the size of the object acquired in step S822. If the size of the margin area in page P1 is equal to or greater than the size of the object in page P2 (YES in step S823), in step S824, it is determined that the layout can be changed. On the other hand, if the size of the margin area in page P1 is not equal to or greater than the size of the object in page P2 (NO in step S823), in step S825, it is determined that the layout cannot be changed.

The processing of FIG. 8 will now be described in more detail using FIGS. 3 to 6.

FIG. 3A includes pages 301 to 303, in which objects 311 to 314 are arranged. Here, although the objects 311 to 314 are represented using simple rectangular shapes, in actual practice these objects may have smaller objects (characters etc.) therein. In the present application, simplified rectangles are used for the objects. However, more detailed objects may be present therein. In FIG. 3A, the pages 301 and 302 are selected and being displayed.

The result in FIG. 3B is obtained by executing the layout change command.

If the "display next layout change targets" command is instructed in this state, the currently selected page 301 becomes P1, and thus the page 302 becomes P2.

Although P2 (page 302) is not a blank page, since it is already selected, P2 is set as P1. Consequently, P1 becomes page 302, and P2 becomes page 303.

Further, page 303 is not a blank page, and it is not already selected. Consequently, the processing of step S812 is executed.

Since the size of the margin area of page 302 is larger than the size of the object 313 in page 303, the control unit determines that the layout can be changed.

Consequently, as illustrated in FIG. 3C, P1 (page 302) and P2 (page 303) are selected and displayed as the next layout targets.

Next, the example of FIG. 4 will be described.

FIG. 4A includes pages 401 to 404, and objects 411 to 414 which are arranged in the pages 401 to 404. The pages 401 and 402 are selected and being displayed.

Figure 4B:
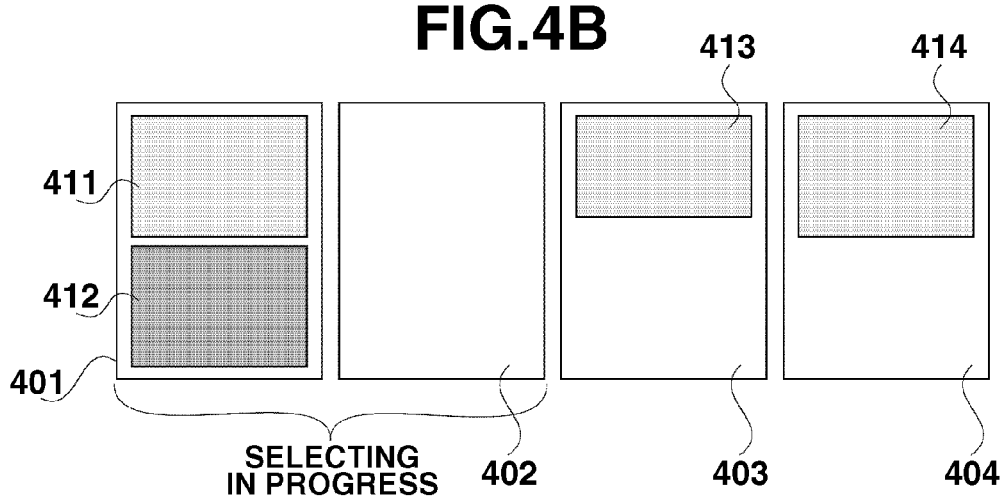

If layout change is executed on these two selected pages, the result is as illustrated in FIG. 4B. The object 412 is moved to page 401, and page 402 is a blank page. In this example, since page 401 is now already full of objects, page 401 can no longer serve as a layout change target.

If the "display next layout change targets" command is instructed in this state, the currently selected page 401 becomes P1, and thus page 402 becomes P2.

Since page 402 is a blank page, in step S804, increment processing is executed, and P2 becomes page 403.

Page 402 is not a blank page, and it is not already selected. Consequently, the processing of step S812 is executed.

Here, since the size of the margin area of page 401 is not larger than the size of the object 413 in page 403, the control unit determines that the layout cannot be changed.

Figure 4C:
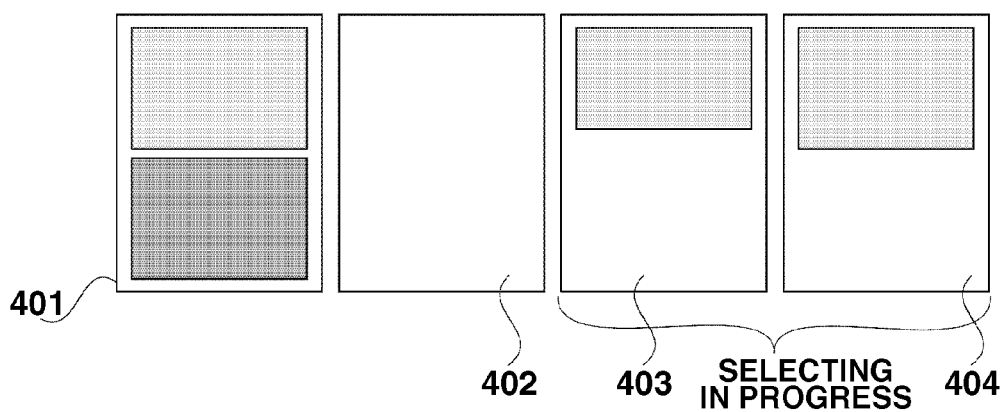

Consequently, in step S813, P1 is set as page 403, and the processing of FIG. 8 is executed, so that, as illustrated in FIG. 4C, the pages 403 and 404 are selected and displayed.

Next, the example of FIG. 5 will be described.

FIG. 5A includes pages 501 to 504, and objects 511 to 514 which are arranged in the pages 501 to 504. The pages 501 and 502 are selected and being displayed. If layout change is executed on these two selected pages, the result is as illustrated in FIG. 5B.

If the "display next layout change targets" command is instructed in this state, the currently selected page 501 becomes P1, and page 502 becomes P2.

However, page 502 is a blank page. Therefore, increment processing is executed, and P2 becomes page 503.

Since the size of the margin area of page 501 is larger than the size of the object 513 in page 503, in step S812, the control unit determines that the layout cannot be changed. Consequently, the pages 501 and 503 are selected and displayed.

Conventionally, since a margin area exists in page 501 in FIG. 5B, the user can set page 501 as a layout change target. However, since page 502 does not have an object whose layout should be changed, the user determines that page 502 will not be a layout change target, and selects the next page 503. Consequently, the processing of selecting page 502 occurs.

However, in the present exemplary embodiment, based on the processing of FIG. 8, the pages 501 and 502 are selected and displayed as the next layout change targets. Therefore, the operational burden on the user can be alleviated.

Next, an example will be described using FIGS. 6A, 6B and 6C.

Figure 6A:
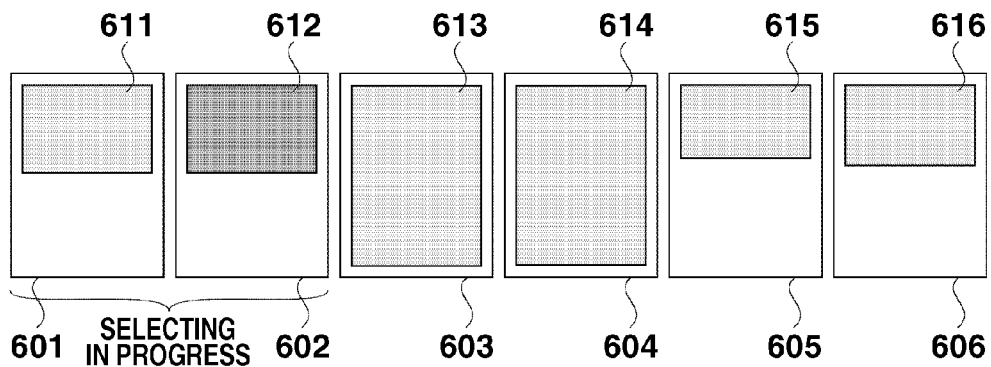
FIGS. 6A, 6B, and 6C illustrate an example of layout change and subsequent page selection change.

FIG. 6A includes pages 601 to 606, and objects 611 to 616 which are arranged in the pages 601 to 606.

Pages 601 and 602 are selected and being displayed. If layout change is executed on these two selected pages, the result is as illustrated in FIG. 6B.

If the "display next layout change targets" command is instructed in this state, the currently selected page 601 becomes P1, and page 602 becomes P2.

Since page 602 is a blank page, in step S804, increment processing is executed, and page 603 becomes P2.

Subsequently, the processing of steps S805 and S806 is performed. Since page 603 is not already selected, step S812 is executed.

Here, since the size of the margin area of page 601 is not larger than the size of the object 613 in page 603, the control unit determines that the layout cannot be changed.

Consequently, page 603 becomes P1 and page 604 becomes P2.

In this state, after executing the processing from steps S802 to S806, step S812 is executed. Consequently, since it is again determined that the layout cannot be changed, page 604 becomes P1 and page 605 becomes P2.

In this state, after executing the processing from steps S802 to S806, step S812 is executed. Consequently, since it is again determined that the layout cannot be changed, page 605 becomes P1 and page 606 becomes P2.

In this state, the processing of FIG. 8 is executed. Consequently, as illustrated in FIG. 6C, the pages 605 and 606 are selected and displayed.

Figure 6B:
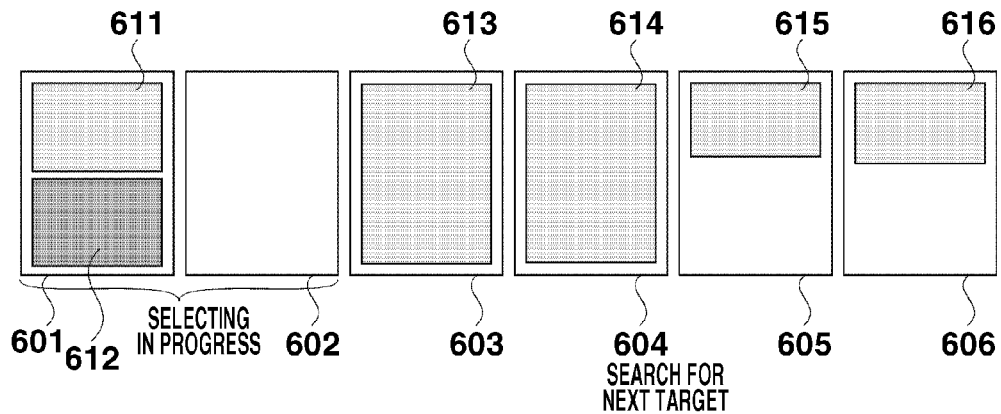
Figure 6C:
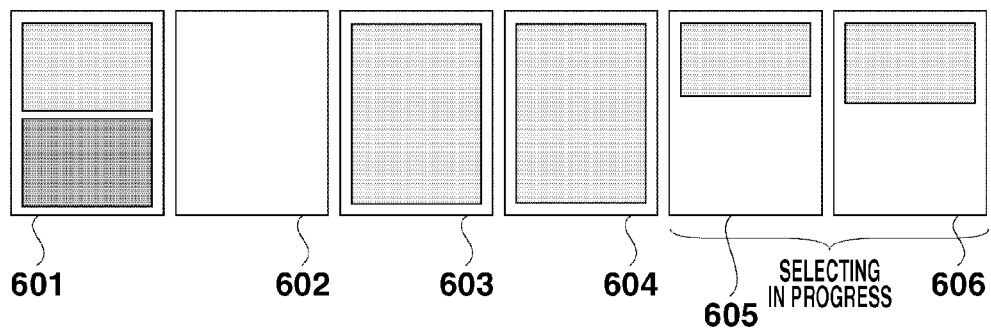

Conventionally, in the state of FIG. 6B, the user displays page 603 as a page to be the next layout target. However, since page 603 has a large object, the user then determines that page 603 cannot serve as a layout target. Thus, the processing of searching for the next layout target pages is to be repeated.

However, in the present exemplary embodiment, by realizing the processing of FIG. 8, the layout target pages 605 and 606 are selected and displayed without increasing the burden on the user. Therefore, an improvement in operability can be achieved.

Thus, in the present exemplary embodiment, the user is not required to determine the arrangement state of the objects in the page, and constantly determine which pages can be combined for a layout change. In addition, since the two pages which are to be the layout targets are selected just by instructing "display next layout change targets", the need to repeat the selection processing is eliminated.

For example, in a user interface like that illustrated in FIG. 7, the user can repeatedly execute the above-described "layout change" and "display next layout change targets" commands by alternating both commands. By repeating these commands, throughout the document, two-page pairs whose layout can be changed can be sequentially displayed. Thus, the need for layout change can be determined, and the layout change can be executed. Further, the movement to the next target can be performed. Therefore, the processing according to the exemplary embodiment of the present invention has a great effect of simplifying operations.

In the present exemplary embodiment, only two pages are simultaneously displayed. However, depending on a way of carrying out the present invention, a user interface is also feasible in which more than two pages are simultaneously displayed as selection targets.

In the first exemplary embodiment, the determination about whether the layout can be changed is made between consecutive pages. However, as to a document which is not assumed to have continuity between pages (e.g., a document in which small independent items are listed), there is no significant issue even if the layout change is performed between non-consecutive pages.

Accordingly, in a second exemplary embodiment, processing will be described for selecting and displaying layout target pages by changing the layout between non-consecutive pages.

In the second exemplary embodiment, basically the same processing as in the first exemplary embodiment is executed. However, step S813 is different.

In the first exemplary embodiment, the page set as P2 is set as P1. However, in the second exemplary embodiment, increment processing is executed on P2.

Consequently, while the arrangement sequence of the objects is changed, as many objects as possible can be arranged within the page, which helps in saving paper.

This processing will now be described in more detail using FIG. 15.

Figure 15A:
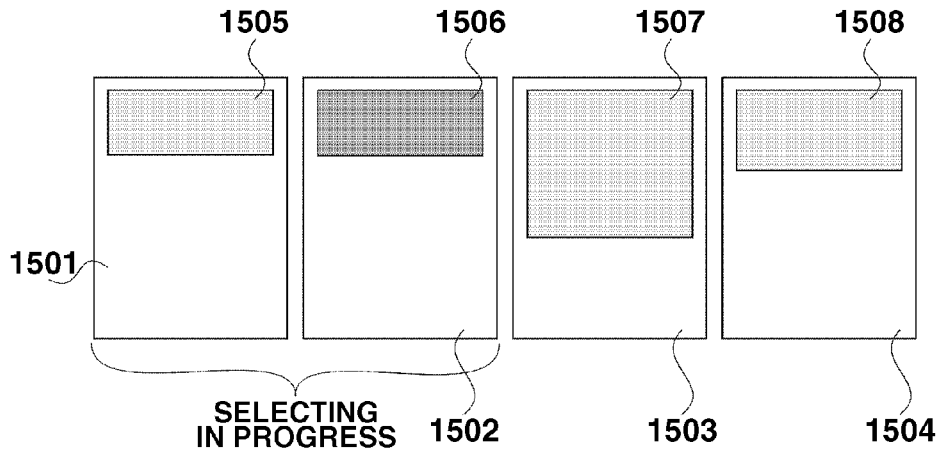
FIGS. 15A, 15B, and 15C illustrate an example of layout change and subsequent page selection change.
Figure 15B:
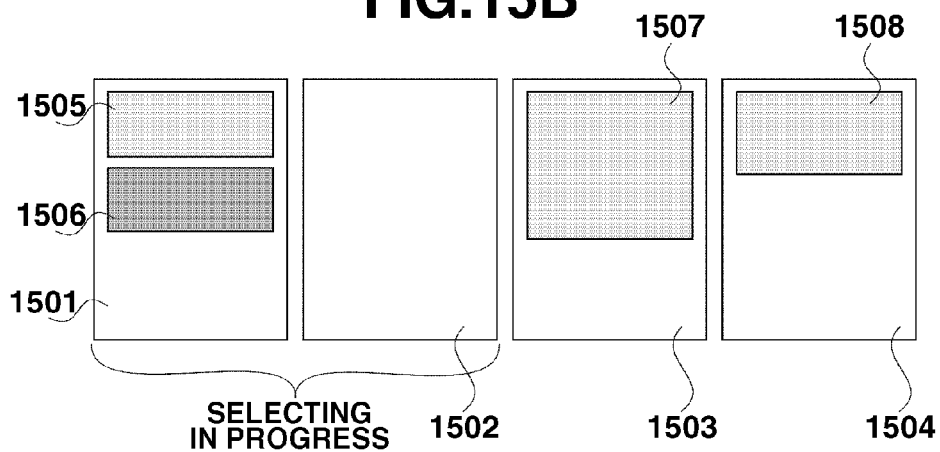

FIG. 15 includes pages 1501 to 1504, and objects 1505 to 1508 which are arranged in the pages 1501 to 1504. The result of the layout change of FIG. 15A is as illustrated in FIG. 15B.

Since page 1501 still has a margin area and other objects can be arranged therein, the control unit determines whether layout change is possible using the pages 1501 and 1503. Since the size of the margin area of page 1501 is smaller than the size of the margin area of page 1503, the control unit determines that the layout cannot be changed.

In the present exemplary embodiment, after this determination, increment processing is performed on P2. Consequently, page 1501 becomes P1, and the page 1502 becomes P2.

Then, the control unit determines whether layout change is possible using the pages 1501 and 1504. Since the size of the margin area of page 1501 is larger than the size of the margin area of page 1504, the control unit determines that the layout can be changed.

Figure 15C:
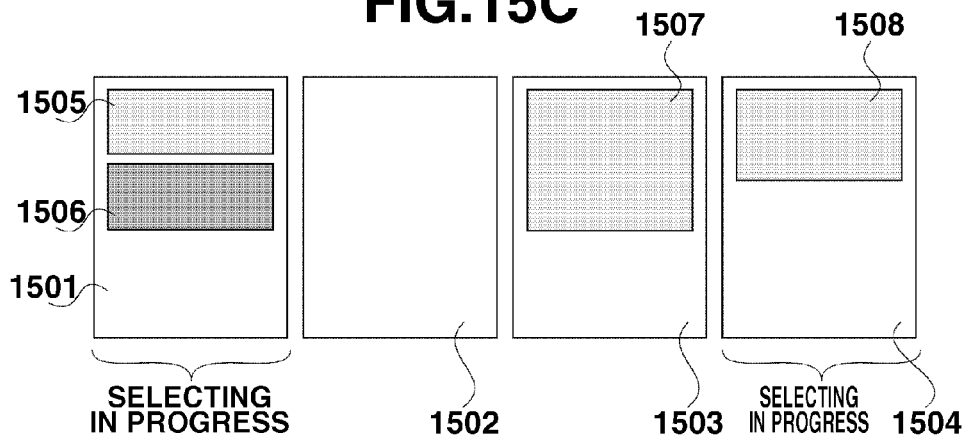

Then, as illustrated in FIG. 15C, the pages 1501 and 1504 are selected and displayed.

Thus, in the present exemplary embodiment, the user is not required to determine the pages to serve as layout targets by considering the size of the margin area and the size of the object, thereby the operational burden on the user can be alleviated.

In the first and second exemplary embodiments, whether the layout can be changed is determined by comparing the size of the margin area with the size of a unit object. However, in a third exemplary embodiment, an example will be described in which it is determined whether the layout can be changed by comparing the size of the margin area with a set of a plurality of objects.

Figure 9A:
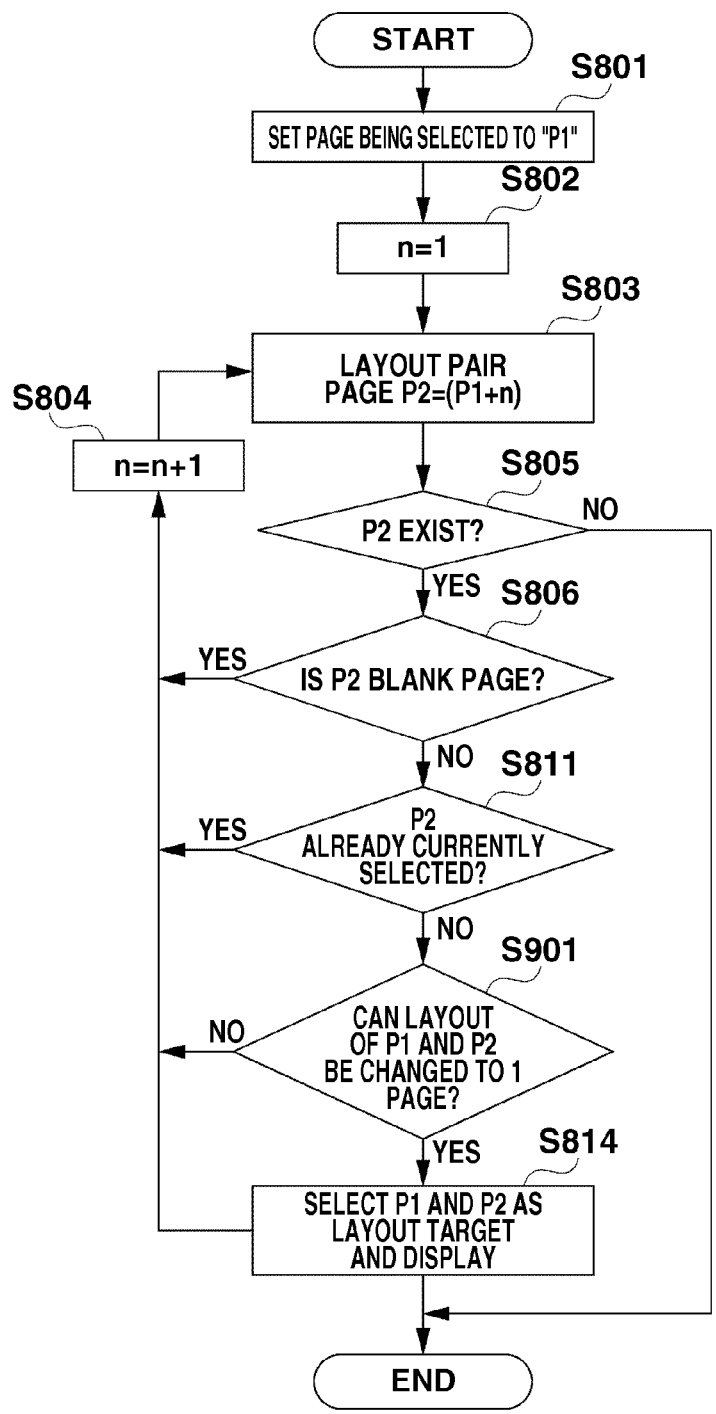
FIGS. 9A and 9B are flowcharts illustrating a second exemplary embodiment.
Figure 9B:
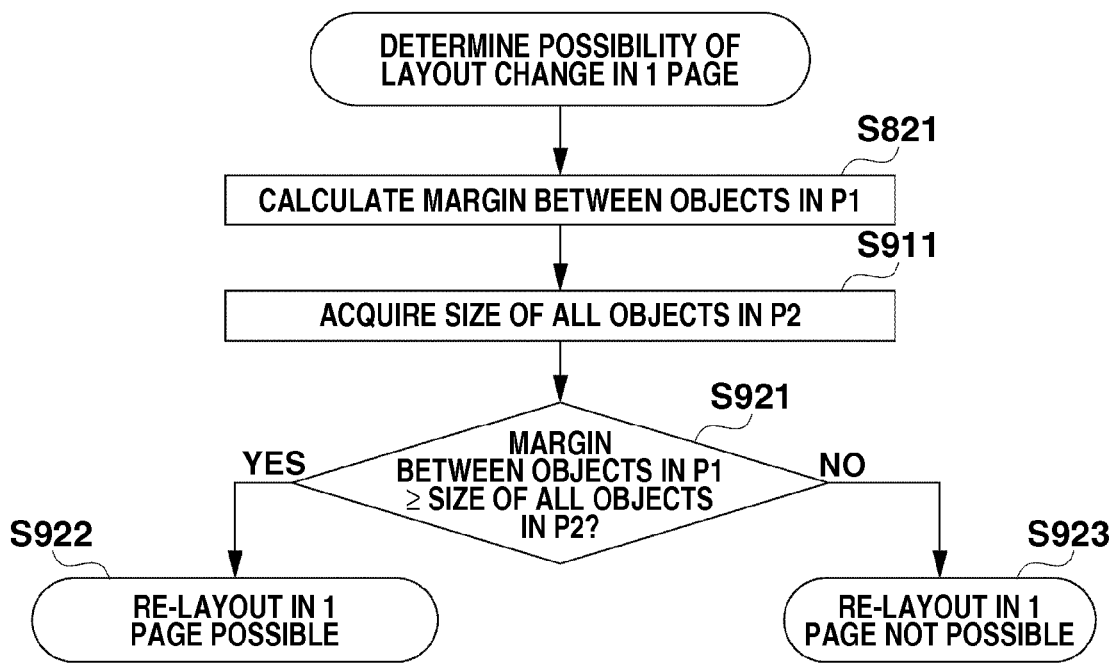

FIGS. 9A and 9B are flowcharts according to the third exemplary embodiment. These flowcharts illustrate the operations of the control unit when executing the "display next layout change targets" command.

In steps S801 to S811 and S814 in FIG. 9A, the same processing as in the flowchart of FIG. 8A as described in the first exemplary embodiment is performed. Therefore, a description of such steps will be omitted here. However, step S901 is different. In step S901, the control unit determines whether all of the objects in P2 can be arranged in the margin area of the page P1, and based on that determination result, the control unit determines whether the layout can be changed. FIG. 9B is a flowchart describing step S901 in detail.

In step S821, the control unit calculates the size of the margin area between the objects within page P1. Then, in step S911, the control unit acquires the size of all the objects in page P2.

In step S921, the control unit compares the size of the margin area obtained in step S821 with the sum size of all the objects obtained in step S911. If the size of the margin area in page P1 is equal to or greater than the size of all the objects within page P2 (YES in step S921), in step S922, it is determined that the layout can be changed so as to fit in one page. On the other hand, if the size of the margin area in page P1 is not equal to or greater than the size of the all the objects in page P2 (NO in step S921), in step S923, it is determined that the layout cannot be changed to fit in one page.

Figure 10A:
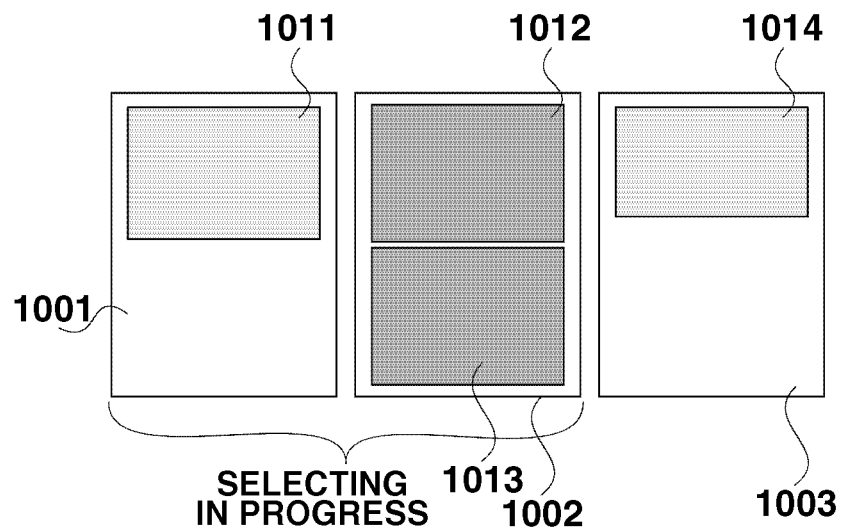
FIGS. 10A and 10B illustrate an example of page selection change according to a third exemplary embodiment.

Selection of layout change target page which becomes possible based on the above sequence will now be described as an example with reference to FIGS. 10A and 10B. FIG. 10A includes pages 1001 to 1003, and objects 1011 to 1014 which are arranged in the pages 1001 to 1003. The pages 1001 and 1002 are selected and being displayed.

In this example, while the object 1002 can be moved to page 1001, in that case, a layout change successively with the pages 1002 and 1003 is to be performed in order to fill the margin area of page 1002 after the object 1012 has been moved.

Thus, according to the present exemplary embodiment, when the "display next layout change targets" command is executed, the control unit determines whether both of the objects 1012 and 1013 of page 1002 can be arranged in the margin area of page 1001. If the control unit determines that both of the objects 1012 and 1013 cannot be arranged, the control unit then determines whether all of the objects (object 1014) of page 1013 can be arranged in the margin area of page 1001.

Figure 10B:
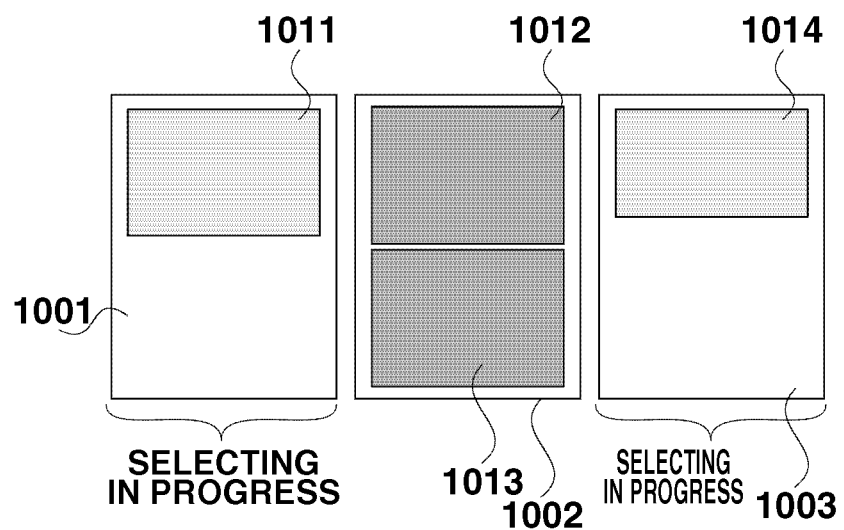

If the control unit determines that both of the objects 1012 and 1013 can be arranged, the pages 1001 and 1003 are selected as the layout targets, as illustrated in FIG. 10B.

According to the present exemplary embodiment, the layout change of the whole document can be performed efficiently without disrupting the layout of the pages which already have a small margin amount.

Document layout change which is not assumed to have continuity between pages as is described in the second and third exemplary embodiments will now be considered.

Figure 11A:
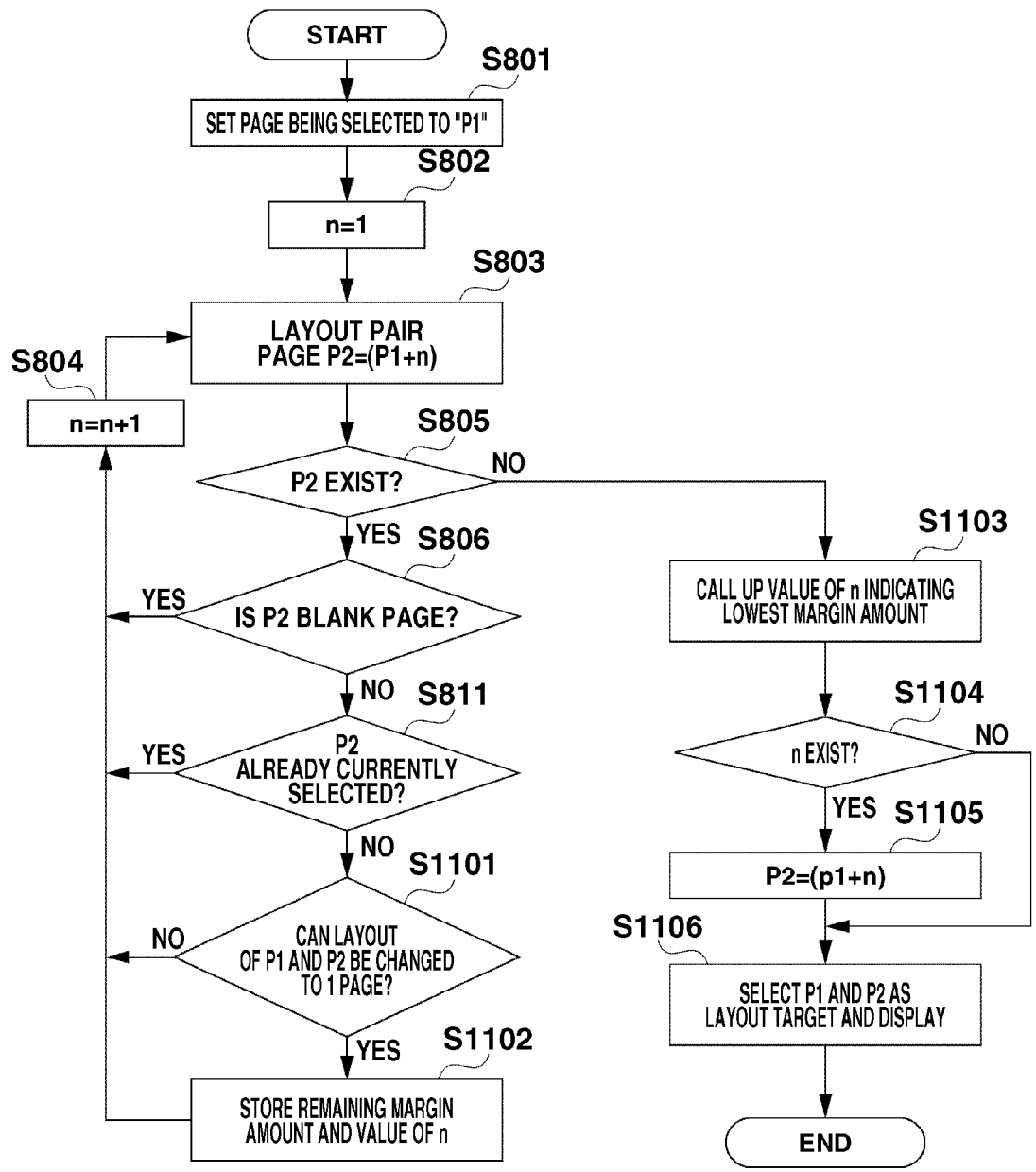
FIGS. 11A and 11B are flowcharts illustrating a fourth exemplary embodiment.
Figure 11B:
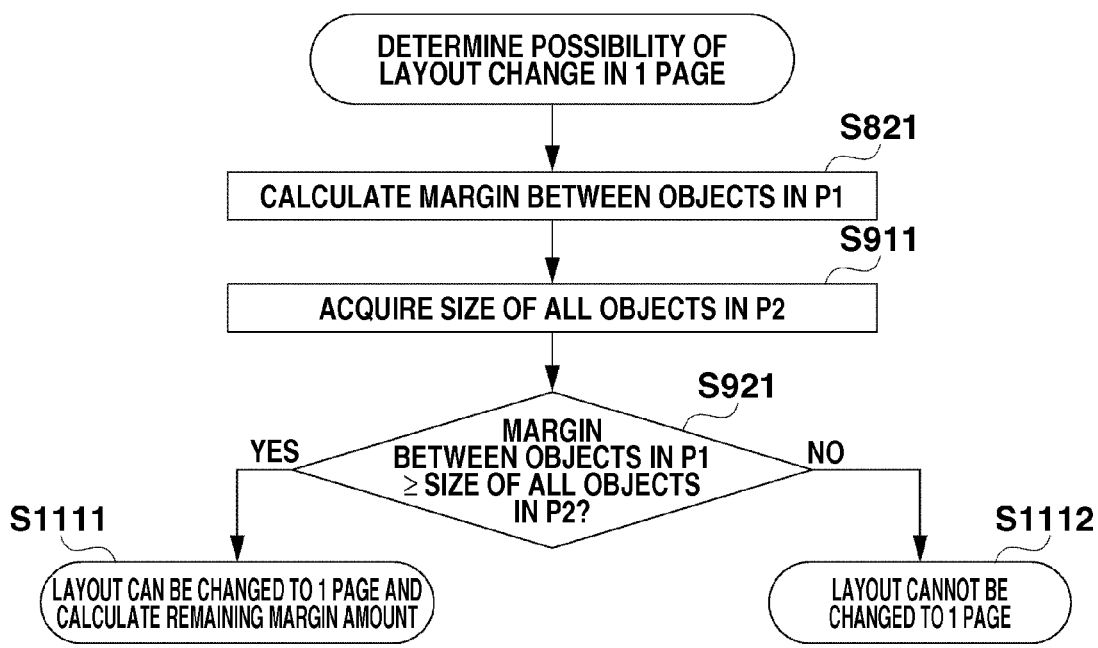

FIGS. 11A and 11B are flowcharts according to a fourth exemplary embodiment. These flowcharts illustrate the operations of the control unit when executing the "display next layout change targets" command.

In steps S801 to S811, the same processing as in the flowchart of FIG. 8A as described in the first exemplary embodiment is performed. Therefore, a description of such steps will be omitted here. However, step S1101 is different. In step S1101, the control unit determines whether all of the objects in the pages P1 and P2 can fit into the single page of page P1.

Step S1101 will now be described in more detail using FIG. 11B.

In steps S821 to S921, the same processing as in the flowchart of FIG. 9B as described in the third exemplary embodiment is performed. Therefore, a description of such steps will be omitted here.

If it is determined in step S921 that the margin area between the objects within P1 is equal to or greater than the size of all the objects within P2 (YES in step S921), in step S111, the control unit determines that the layout can be changed so as to fit in one page. Consequently, the control unit arranges the objects of P2 in P1, stores the size of the margin area produced in P1 in the memory, and returns to step S1101. The size of the margin area produced in P1 is calculated by acquiring the difference between the size of the margin area of P1 and the sum of all the objects of P2, which were compared in step S921.

If it is determined in step S1101 that the layout of P1 and P2 can be changed to one page (YES in step S1101), in step S1102, the control unit stores the size of the remaining margin area and the value of n in an array.

If it is determined in step S805 that there are no more pages P2 to be compared (NO in step S805), the control unit proceeds to step S1103. In step S1103, the control unit calls up the value of n which indicates the lowest margin area size from among the values of n corresponding to the size of the margin area stored in the array in step S921.

Consequently, the control unit selects and displays the P2 determined using the called-up value of n as the layout change target of P1.

Selection of layout change target page which becomes possible based on the above sequence will now be described as an example with reference to FIGS. 12A and 12B.

Figure 12A:
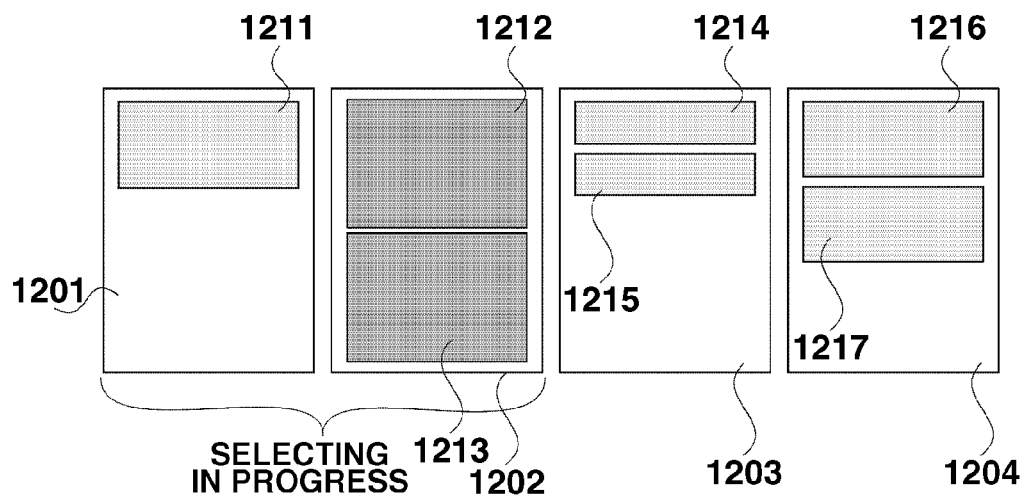
FIGS. 12A and 12B illustrate an example of page selection change according to a fourth exemplary embodiment.

FIG. 12A includes pages 1201 to 1204, and objects 1211 to 1217 which are arranged in the pages 1001 to 1003. The pages 1201 and 1202 are selected and being displayed. Both the set of objects 1214 and 1215 of the page 1203 (first page) and the set of objects 1216 and 1217 of the page 1204 (second page) can be moved to the page 1201. However, the size of the margin area of the page 1201 produced by the movement of the objects 1216 and 1217 to the page 1201 is smaller than the size of the margin area of the page 1201 produced by the movement of the objects 1214 and 1215 to the page 1201.

Figure 12B:
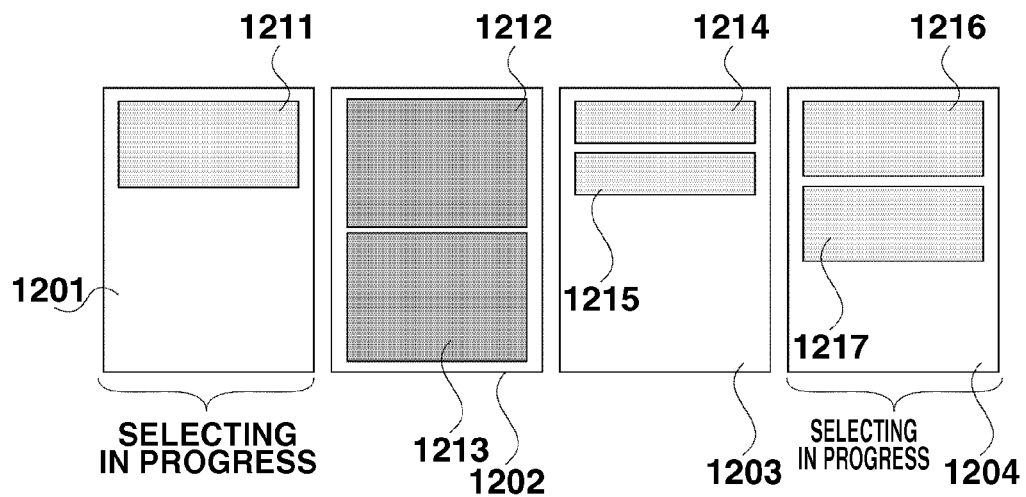

Consequently, in the present exemplary embodiment, when the "display next layout change targets" command is executed, the document can be moved from the state of FIG. 12A to the state illustrated in FIG. 12B in which the pages 1201 and 1204 are selected.

According to the present exemplary embodiment, the page whose margin area decreases after layout change can be selected.

In the present application, an example of a user interface is described in which two layout change target pages are displayed. After execution of the "display next layout change targets" command, the changed layout is displayed. However, as illustrated in FIG. 13, for example, an interface can also be created which, simultaneously with displaying the two layout change target pages, displays an execution preview of the layout of those two pages when it is changed.

In FIG. 13, the interface includes the various elements 701 to 722 with the same configuration as FIG. 7, as well as the following elements. Namely, a preview area 1321, pages 1301 and 1302, which are obtained by changing the layout of the pages 711 and 712, and pages 1311 and 1312, which are obtained by changing the layout of the pages 713 and 714.

Thus, by simultaneously displaying a preview of how layout change will be performed, the page configuration after the layout change is applied can be confirmed. Consequently, the user can more clearly determine whether the layout change is performed or not, thereby determination can be made faster.

According to the present invention, the layout target pages can be selected without increasing the operational burden on the user.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-076773 filed Mar. 26, 2009, which is hereby incorporated by reference herein in its entirety.

What is claimed is:

1. An apparatus having a central processing unit (CPU) comprising:

a receiving unit configured to receive a first command to display a next pair of target pages from a user;

a selection unit configured to select, if the receiving unit receives the first command to display the next pair of target pages, a page having a margin area from a plurality of pages as a next target page, wherein the margin area is an area in which no object is arranged in the next target page;

a detection unit configured to detect a page having an object which fits in the margin area in which no object is arranged in the next target page, from among pages following the next target page, wherein, if the detected page is already selected as the next pair, the processes of the selection unit and the detection unit are repeatedly executed;

a display unit configured to display a combination of the selected next target page and the detected page as the next pair of target pages; and a changing unit configured to change a layout of the next pair being displayed by the display unit if the receiving unit receives a second command to change the layout of the next pair displayed by the display unit.

2. The apparatus according to claim 1, wherein the display unit displays thumbnail images of the next pair of the target pages.

3. The apparatus according to claim 1, wherein the display unit displays a screen including a thumbnail area displaying a thumbnail of a page included in a document and a work area displaying the next pair of target pages.

4. A control method comprising:

receiving a first command to display a next pair of target pages from a user;

selecting a page having a margin area from a plurality of pages as a next target page if the first command is received, wherein the margin area is an area in which no object is arranged in the next target page;

detecting a page having an object which fits in the margin area in which no object is arranged in the next target page, from among pages following the next target page, wherein, if the detected page is already selected as the next pair, the selecting and detecting processes are repeatedly executed;

displaying a combination of the selected next target page and the detected page as the next pair of target pages; and changing a layout of the displayed next pair if a second command to change the layout of the displayed next pair is received.

5. The method according to claim 4, wherein displaying the combination of the selected next target page and the detected page as the next pair of target pages comprises displaying thumbnail images of the next pair of target pages.

6. The method according to claim 4, wherein the displaying comprises displaying a screen including a thumbnail area displaying a thumbnail of a page included in a document and a work area displaying the next pair of target pages.

7. A non-transitory computer readable storage medium storing a computer-executable program of instructions that, when executed by a processor, cause the processor to perform operations comprising:

receiving a first command to display a next pair of target pages from a user;

selecting a page having a margin area from a plurality of pages as a next target page if the first command is received, wherein the margin area is an area in which no object is arranged in the next target page;

detecting a page having an object which fits in the margin area in which no object is arranged in the next target page, from among pages following the next target page, wherein, if the detected page is already selected as the next pair, the selecting and detecting operations are repeatedly executed;

displaying a combination of the selected next target page and the detected page as the next pair of target pages; and changing a layout of the displayed next pair if a second command to change the layout of the displayed next pair is received.

8. The computer readable storage medium according to claim 7, wherein the displaying operation comprises displaying thumbnail images of the next pair of target pages.

9. The non-transitory computer readable storage medium according to claim 7, wherein the displaying comprises displaying a screen including a thumbnail area displaying a thumbnail of a page included in a document and a work area displaying the next pair of target pages.

10. An apparatus comprising at least one central processing unit (CPU) and a memory, wherein the CPU functions as:

a receiving unit configured to receive a first command to display a next pair of target pages from a user;

a selection unit configured to select, if the receiving unit receives the first command to display the next pair of target pages, a page having a margin area from a plurality of pages as a next target page, wherein the margin area is an area in which no object is arranged in the next target page;

a detection unit configured to detect a page having an object whose size is equal to or smaller than a size of the margin area in which no object is arranged in the next target page, from among pages following the next target page, wherein, if the detected page is already selected as the next pair, the processes of the selection unit and the detection unit are repeatedly executed;

a display unit configured to display a combination of the selected next target page and the detected page as the next pair of target pages; and a changing unit configured to change a layout of the next pair being displayed by the display unit if the receiving unit receives a second command to change the layout of the next pair displayed by the display unit.

11. A control method comprising:

receiving a first command to display a next pair of target pages from a user;

selecting a page having a margin area from a plurality of pages as a next target page if the first command is received, wherein the margin area is an area in which no object is arranged in the next target page;

detecting a page having an object whose size is equal to or smaller than a size of the margin area in which no object is arranged in the next target page, from among pages following the next target page, wherein, if the detected page is already selected as the next pair, the selecting and detecting processes are repeatedly executed;

displaying a combination of the selected next target page and the detected page as the detected next pair of target pages; and changing a layout of the displayed next pair if a second command to change the layout of the displayed next pair is received.

12. A non-transitory computer readable storage medium storing a computer-executable program of instructions that, when executed by a processor, cause the processor to perform operations comprising:

receiving a first command to display a next pair of target pages from a user;

selecting a page having a margin area from a plurality of pages as a next target page if the first command is received, wherein the margin area is an area in which no object is arranged in the next target page;

detecting a page having an object whose size is equal to or smaller than a size of the margin area in which no object is arranged in the next target page, from among pages following the next target page, wherein, if the detected page is already selected as the next pair, the selecting and detecting processes are repeatedly executed;

displaying a combination of the selected next target page and the detected page as the detected next pair of target pages; and changing a layout of the displayed next pair if a second command to change the layout of the displayed next pair is received.

\* \* \* \* \*